(12) United States Patent
Dawson

(10) Patent No.: US 8,555,823 B2
(45) Date of Patent: Oct. 15, 2013

(54) PROCESS FOR POWERING AN ENGINE WITH WATER BY SIMULTANEOUSLY SEPARATING HYDROGEN FROM OXYGEN AND IGNITING THE HYDROGEN IN THE COMPRESSION/COMBUSTION CHAMBER

(76) Inventor: Fred Dawson, Las Vegas, NV (US)

( * ) Notice: Subject to any disclaimer, the term of this patent is extended or adjusted under 35 U.S.C. 154(b) by 270 days.

(21) Appl. No.: 13/011,847

(22) Filed: Jan. 21, 2011

(65) Prior Publication Data

US 2012/0186542 A1  Jul. 26, 2012

(51) Int. Cl.
 *F02B 43/10* (2006.01)
 *F02B 47/02* (2006.01)
(52) U.S. Cl.
 USPC ............ 123/3; 123/25 R; 123/25 A; 123/536; 123/538; 60/775; 60/39.53

(58) Field of Classification Search
 USPC ............ 123/3, 25 A, 25 C, 536, 538; 60/775
 See application file for complete search history.

(56) References Cited

U.S. PATENT DOCUMENTS

| | | | |
|---|---|---|---|
| 6,257,175 B1 * | 7/2001 | Mosher et al. | 123/3 |
| 2009/0235902 A1 * | 9/2009 | Coffey et al. | 123/536 |
| 2010/0288212 A1 * | 11/2010 | Williams | 123/3 |

* cited by examiner

*Primary Examiner* — Lindsay Low
*Assistant Examiner* — Kevin Lathers

(57) ABSTRACT

An improved method of powering an engine using water as a fuel by separating the hydrogen and oxygen atoms and igniting the hydrogen with high voltage high amperage dc electricity in the compression/combustion chamber of the engine and recycling the exhaust water for reuse.

8 Claims, 3 Drawing Sheets

PROCESS FOR POWERING AN ENGINE WITH WATER BY SIMULTANEOUSLY SEPARATING HYDROGEN FROM OXYGEN AND IGNITING THE HYDROGEN IN THE COMPRESSION/COMBUSTION CHAMBER

FIELD OF INVENTION

This invention relates to a method for using water as a fuel to power an engine. Specifically, this invention is a process that separates hydrogen from oxygen in water simultaneous with ignition of said hydrogen facilitated by a high voltage, high amperage electrical arc inside the combustion/compression chamber of an engine and recycling the exhaust water.

BACKGROUND

Hydrogen and oxygen are ideal fuels for combustion and are both readily available in water if the bond holding them together can be separate efficiently. Two methods for separating hydrogen from oxygen have been used over the years including electrolysis, and separation via steam reforming. Both methods use tremendous amounts of energy and are therefore expensive and make powering an internal combustion engine from hydrogen cost prohibitive for common use. The second problem faced with utilizing the aforementioned method of producing hydrogen from water is that it must be stored until it is used. And, because it is highly flammable, great care must be taken to insure safe storage which further elevates the cost.

Another problem with storage is that hydrogen has such a low density that one cubic foot contains very little hydrogen! One pound of hydrogen at standard temperature and pressure takes up nearly the space of a small bathroom! This results in one cubic foot of hydrogen only containing around 320 Btu of energy. One million Btus would therefore take up around 3100 cubic feet, or 8 feet by 20 feet by 20 feet, the space of nearly half a small house full of hydrogen! The third major problem with hydrogen when stored in the gas form, the absolute need to compress it to get a sufficient amount of hydrogen down into a manageable space. Extremely high pressure tanks, at 3000 PSI, can hold around one pound of hydrogen (in a massive tank about the size and weight of a small person) or 60,000 Btu. So, 17 such tanks would be required for our one million BTUS of storage. Tanks have to be very sturdy and reliable (and heavy) to withstand 3,000 PSI of pressure, but another problem is that a really strong and expensive compressor is needed to compress the hydrogen to 3,000 PSI, (200 times normal atmospheric pressure) which again requires excessive energy consumption. If a 3000 PSI tank of hydrogen were in a vehicle, and that vehicle got into an accident, it would be very dangerous if the tank was damaged!

These problems are solved with this invention. Water is a safe and convenient way to store and transport hydrogen and has more stored energy by weight and volume than gasoline. High voltage high amperage electrical current can be generated with excess energy output of an internal combustion engine or even a jet powered, or rocket engine in sufficient quantity to simultaneously separate and ignite hydrogen which will robustly combust in the presence of oxygen also released in the process.

Another problem this invention solves is atmospheric pollution. The main by product of combustion of hydrogen and oxygen is water, not sulphur dioxide, nitric oxide, carbon dioxide and other harmful by products emitted from burning fossil fuels to power internal combustion engines, jet engines and rocket engines.

Coffey et al U.S. Pat. No. 20090235902 provided a simplified method for converting water into fuel for vehicles and power plants. Coffey's invention uses electrolysis of water with a 25% sodium hydroxide solution to convert water into 2 gases, H2 and O2; conducts these gases separately into a manifold where they are mixed and into a cylinder in a conventional engine where the gas mixture is fired with a spark plug. The resultant water vapor exits the engine in the form of steam. He then transfers the steam to power a steam turban engine before going to a condenser where it is condensed back into water form and cooled for reuse in his electrolyzer. The invention currently applied for eliminates the need for adding sodium hydroxide to water or even the need for hydrolysis to use water as a fuel. In fact, the invention applied for uses water as a fuel both in the form of gas or liquid. Coffee et al's invention uses H2 and O2 as 2 separate gases as they are molecules formed when electrolysis breaks the hydrogen oxygen bond and the atoms are free to recombine into molecules to become separate gases. The gas can then be ignited with a low amperage spark, but; heat is given off as the atoms disassociate as molecules through the conventional oxidation process and convert back to free atoms so they can recombine as H2O (water). It is well known in the art that a spark will not ignite water. In the invention applied for, the Hydrogen Oxygen bond is broken with an arc carrying much greater current than a spark and the arc fires the water directly; freeing and igniting hydrogen and oxygen in an atomic state which does not produce much heat. (See "Water Atomization by High Magnitude Electrical Impulses" a study by Powerlabs.org). The result is water not steam. That water can then be recycled without the need for condensing it from steam to liquid. The improvements the invention applied for over Coffey et al includes but is not limit to: 1. Eliminating the need to mix sodium hydroxide with water, 2. Eliminating the need for electrolysis, 3. Eliminating the need for handling flammable gases 4. Eliminating the need for condensing steam for water reuse and cooling the water so it can be electrolyzed. 5. Using hydrogen and oxygen as fuel on a more ideal 2 to 1 basis, 2 parts hydrogen to one part oxygen, the same ratio NASA uses to fuel its liquid hydrogen powered rockets. 6. Using water as a fuel in the form of a single gas, not 2 gases.

Moshure et al. U.S. Pat. No. 6,251,175 presents a new and useful apparatus for generating hydrogen and oxygen with electrolysis, for conveying hydrogen and oxygen gas into an engine, collector cells for collecting hydrogen and an apparatus for preventing the generation of hydrogen when the engine is not running. The invention applied for is an improvement over Moshure et al because, all of Moshure et al's apparati are eliminated as a means to power an engine with water. In the invention applied for, water is fed directly into the combustion chamber of an engine and fired directly either as a gas or as a liquid.

SUMMARY

The inventor of the subject matter herein disclosed and claimed has solved the aforementioned problems with the invention of a new method of powering an engine. Utilizing an air and water vapor mixture drawn or forced into the combustion chamber of an engine and ignited at the correct timing moment by means of at least one pair of electrodes one positively charged and the other negatively charged, separated by an "air gap" with a high voltage high amperage electrical current creating an arc between the two poles, resulting in a rapid expansion of the volume inside the chamber as the current separates the hydrogen from the oxygen in the water present and ignites the hydrogen. Also, this method can be used to power a jet or rocket engine by utilizing a high voltage high amperage electrical arc field to separate hydrogen from oxygen entering in a continuous water spray and detonate the hydrogen, creating thrust. Further, this method of detonation can be used to separate hydrogen from oxygen in water and instantly detonate the hydrogen in an enclosed chamber filled only with water, forcing movement of the water which results in a water powered motor or water pump.

DETAILED DESCRIPTION

Figure 1:
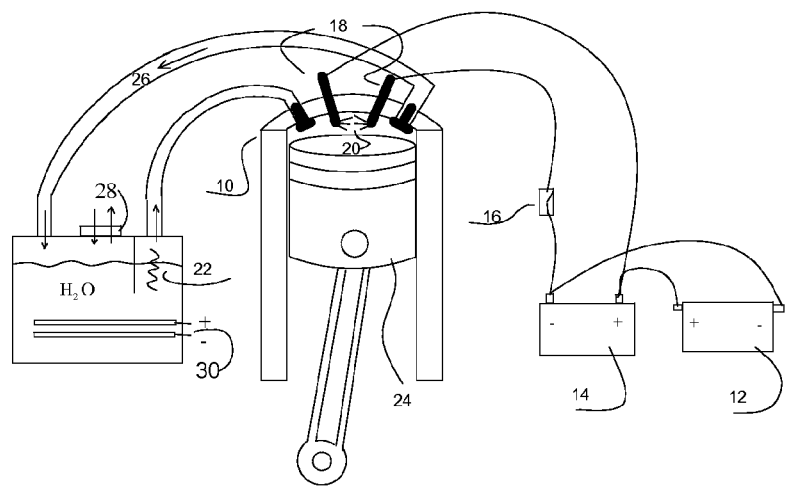
FIG. 1 shows a compression chamber section of a reciprocating piston engine utilizing a high voltage high amperage arc to free hydrogen from water vapor to fuel the engine.

FIG. 1 shows an engine section with a compression/combustion chamber 10 with a high voltage generator 12 producing 5000V or greater DC current. Said generator feeds electricity to a high voltage capacitor 14 capable of storing 40 uF or greater of electrical current. A switching device 16 timed for peak compression and cylinder stoke interrupts the circuit which feeds two electrodes 18 protruding into the compression/combustion chamber 10 which are spaced with a 6 mm or greater air gap to create an arc 20 for combustion. A humidifier 22 producing water vapor from a water tank which enters a conduit leading directly to the engine intake. 24 shows a moveable cylinder inside said compression/combustion chamber 10 that when set in motion by the expanding gasses can be harnessed for power. 26 shows a conduit for returning exhaust from engine to water storage tank for recycling of water, 28 shows a filter through which air passes in and out of said water tank and 30 shows pair of parallel positively and negatively charged panels powered with lower voltage dc current for imparting heat to the water to maintain temperature control of the water and water vapor content of the air sent from the tank to the compression camber 10.

Figure 2:
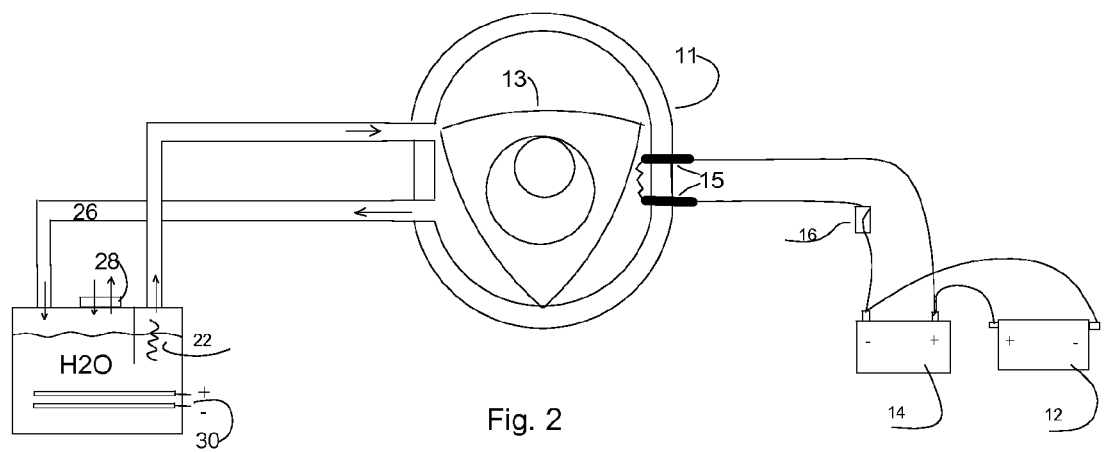
FIG. 2 shows a cross section of the compression chamber of a rotary engine utilizing high voltage high amperage electrical current to free hydrogen from water vapor to fuel the engine.

FIG. 2 shows a rotary engine's compression chamber 11 and 13 shows a rotary off set triangular piston 15 shows a pair of air gapped electrodes 12 shows a high voltage DC generator 14 shows a high voltage capacitor 16 shows a timed switching device to control the current between the capacitor and electrodes 15 shows a water tank containing a humidifier 22 feeding water vapor into the air intake of the engine and 26 shows the exhaust conduit returning water to the water tank for recycling. 28 and 30 perform as in FIG. 1

Figure 3:
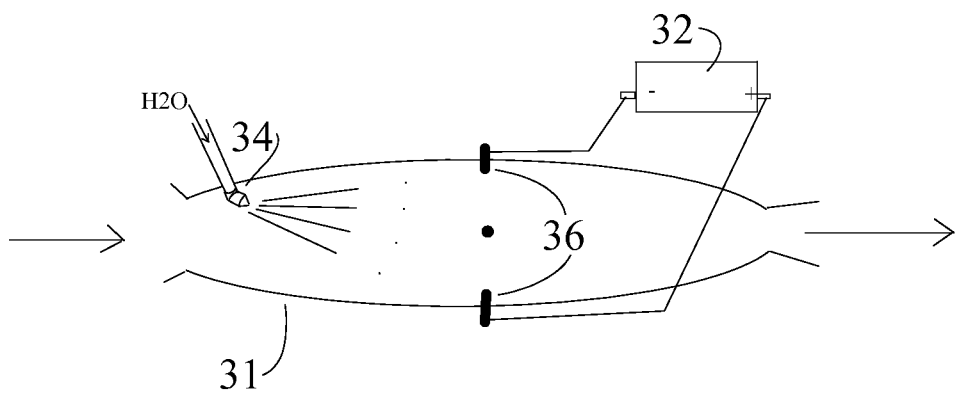
FIG. 3. shows a jet engine.
Figure 3A:
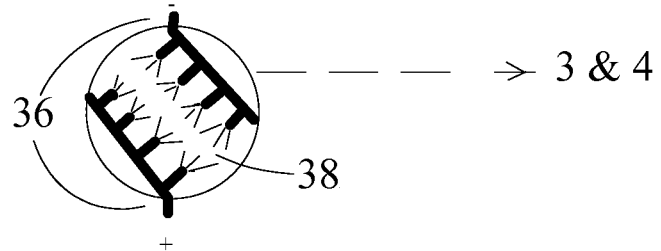
FIG. 3A shows a cross section of both the jet and rocket engines arc field.
Figure 4:
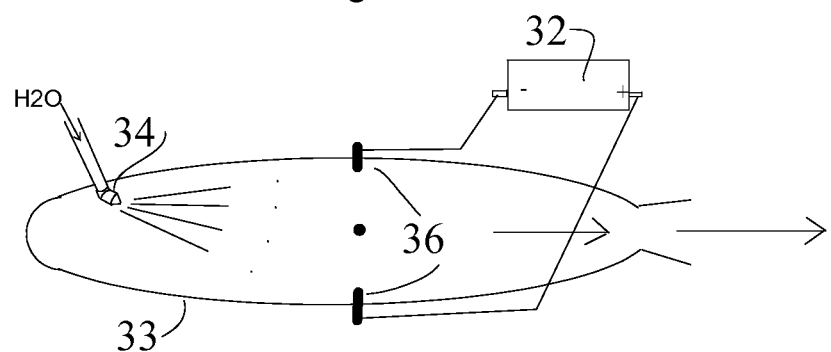
FIG. 4 shows a rocket engine compression chamber utilizing a continuous high voltage high amperage electrical arc field to liberate and ignite the hydrogen in the water as it is sprayed into the field thus powering the engine to create thrust.

FIG. 3 shows a combustion chamber 31 similar to one used in a jet engine. FIG. 3A shows a cross section of the combustion chamber of a jet or rocket engine. FIG. 4 shows a combustion chamber 33 of a rocket engine, 32 shows a high voltage high amperage generator likened to a homopolar machine producing a continuous direct electrical current. 34 shows a spray nozzle injecting a continuos spray of water mist into the center of the combustion chamber 31. 36 shows a pair of horizontally opposed conductors each possessing a multiplicity of electrode tips with each tip spaced for maximum attractive advantage for its polar opposite, creating a field of arching electrical current 38 which in turn separates hydrogen and oxygen and ignites the hydrogen as water particles pass through said arc field. The result of said combustion is a rapid expansion of volume which creates thrust out the exhaust port of the said combustion 31 and 33.

Figure 5:
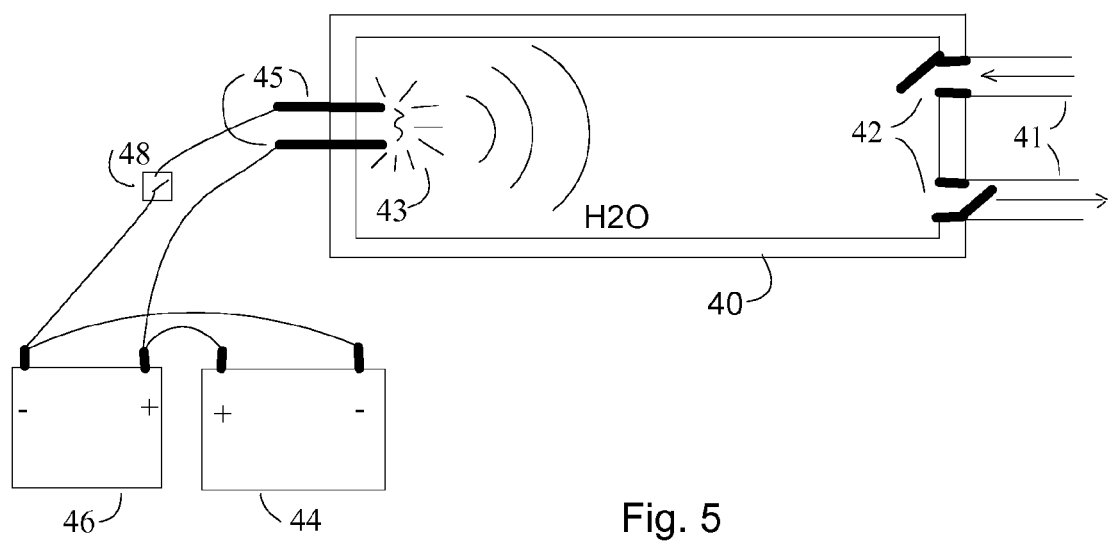
FIG. 5 shows an engine or pump with the compression chamber filled only with water utilizing high voltage high amperage electrical current to free and ignite the hydrogen from the water within the realm of influence of the electrodes arc, rapidly expanding the volume and creating pressure in the chamber.

FIG. 5 shows an enclosed chamber 40 filled with water having a pair of pipes connected on one end 41 with a check valve at the mouth of each pipe where it connects to said chamber 42 one allowing water to flow in and one allowing water to flow out of said chamber 40. At the opposite end of said chamber are mounted a pair of electrodes 45 protruding through the chamber wall. Feeding electrical current to said electrodes are a high voltage generator 44 and a high voltage capacitor 46 with the circuit controlled by a switch 48. The chamber 40 is kept full of water. As an electric arc 43 is created between the electrodes 45 a portion of said water is dissociated as the hydrogen is separated from oxygen and said hydrogen is ignited creating a rapid expansion of volume and a rapid pressure increase in the chamber forcing water out the exit pipe and the following rapid contraction of the volume draws more water into the chamber to replace the water that was expelled. As this expansion and contraction is repeated a pulsing action ensues which is a motive force that can be harnessed for work or motion or serve as a water pump.

In its preferred embodiment, spacing the correct distance for an arc gap between electrodes in the internal combustion engine where water vapor is mixed with compressed air, one must consider the voltage and amperage output of the power supplied in relation to the size of the combustion chamber and frequency of detonation required. That is, at higher voltages, less amperage would be required to achieve combustion. Considering the minimum voltage as 3000V dc with a minimum power output of 500 Joules to achieve detonation of a 6 mm air gap in water, one would then consider increasing the voltage substantially to both charge the capacitor storing the energy faster and widen the air gap to increase both frequency and power of detonation. However, the air gap in high humidity compressed air can be wider without much of an increase in electrical power as there is less resistance for the arc in humid air than in water. The preferred air gap for the electrodes in water laden air would then would be close to 10 mm or even greater. It should be noted that the preferred method of supplying electrical power for detonation in FIGS. 1-4 would be a DC generator such as the homopolar machine which would eliminate the need for a capacitor and supply sufficient on demand electrical current of up to 2000 Joules or better at a constant output as high 100,000V to 200,000V if so needed. While it is commonly believed that too much energy would be required to produce the electrical power needed to maintain an electric arc field necessary to detonated the hydrogen in water to power a jet turban or rocket engine, that turns out not to be the case according to Ohm's law, i.e. as voltage increases, the required amperage proportionately decreases to produce the same amount of power and resistance remains the same as efficiency improves at the higher voltage.

I claim:

1. A method for fueling a reciprocating piston engine with water comprising:

Generating high voltage, high amperage electrical current and at the same time, conveying said current into the combustion chamber of said engine via two or more conductors;

Opening and closing the flow of said current with a switching device;

Vaporizing water from a temperature controlled water tank;

Conveying vaporized water into said chamber via a conduit; and

Arcing said current across one or more pair of electrodes inside said chamber in the presence of said vapor at peak chamber compression to initiate combustion, wherein the fuel source for combustion consists of vaporized water.

2. The method for fueling a reciprocating piston engine with water of claim 1, wherein the piston engine is a rotary engine.

3. The method for fueling a reciprocating piston engine of claim 1, wherein the unused water is recycled for future use by conveying said unused water via a conduit from the exhaust of said chamber back to said tank.

4. A method for producing power for a motor or pump with a fuel source consisting of water, comprising:

Connecting a high voltage, high amperage electrical current means;

Using two or more conductors to convey said current into an enclosed chamber filled with water;

Controlling said flow of said current through said conductors with a switching device;

Controlling flow of said water through an enclosed chamber with an inlet port and an outlet port with one or more check valves; and Arcing said current across two or more electrodes inside said water filled chamber.

5. An apparatus for fueling a reciprocating piston engine with water comprising:

A high voltage, high amperage generator electrically connected to a high voltage, high amperage capacitor electrically connected to a switching device to time the flow of electrical current;

A combustion chamber within an engine;

A temperature controlled water tank which is also a humidifier for producing water vapor to fuel said engine;

A conduit to convey water vapor into said chamber; and

Two or more electrodes in said chamber electrically connected to said switching device for conducting a high voltage, high amperage electric arc to initiate combustion, wherein the fuel source for combustion consists of vaporized water.

6. The apparatus for fueling a reciprocating piston engine with water of claim 5, wherein the reciprocating engine is a rotary engine.

7. The apparatus for producing power for a motor or fuel pump of claim 5, wherein the unused water is recycled for future use by a pipe returning unused water from said engine exhaust to said tank.

8. An apparatus for producing power for a motor or pump with a fuel source consisting of water, comprising:

A chamber filled with water with an intake port and an exit port with one or more check valves; and A high voltage, high amperage electrical current means connected to a high voltage high amperage capacitor connected to a switching device to control electrical current flow to two or more electrodes inside said chamber for arcing said current to initiate combustion, wherein the fuel source for combustion consists of vaporized water.

* * * * *